United States Patent
Frye

(10) Patent No.: US 9,449,213 B2
(45) Date of Patent: Sep. 20, 2016

(54) ANTI-SHOCK RELIEF PRINT SCANNING

(71) Applicant: IB Korea Ltd., Gyeonggi-do (KR)

(72) Inventor: Fred Frye, Simpsonville, SC (US)

(73) Assignee: IB Korea Ltd. (KR)

( * ) Notice: Subject to any disclaimer, the term of this patent is extended or adjusted under 35 U.S.C. 154(b) by 0 days.

(21) Appl. No.: 15/042,426

(22) Filed: Feb. 12, 2016

(65) Prior Publication Data

US 2016/0162722 A1    Jun. 9, 2016

Related U.S. Application Data

(63) Continuation of application No. 14/046,380, filed on Oct. 4, 2013, now Pat. No. 9,262,666.

(60) Provisional application No. 61/709,703, filed on Oct. 4, 2012.

(51) Int. Cl.
   *G06K 9/00* (2006.01)
(52) U.S. Cl.
   CPC .................................. *G06K 9/0004* (2013.01)
(58) Field of Classification Search
   USPC ....... 382/115, 116, 123, 128; 340/5.81, 5.83
   See application file for complete search history.

(56) References Cited

U.S. PATENT DOCUMENTS

| | | | |
|---|---|---|---|
| 5,189,482 A | 2/1993 | Yang | |
| 5,920,642 A * | 7/1999 | Merjanian | A61B 5/1172 340/5.53 |
| 5,974,162 A * | 10/1999 | Metz | A61B 5/1172 356/71 |
| 6,002,786 A | 12/1999 | Hallibert et al. | |
| 6,111,977 A * | 8/2000 | Scott | G06K 9/00013 340/5.53 |
| 6,157,317 A | 12/2000 | Walker | |
| 6,326,644 B1 | 12/2001 | Lee et al. | |
| 6,612,161 B1 * | 9/2003 | Prakash | B82Y 35/00 73/105 |
| 6,688,186 B2 | 2/2004 | Chae | |
| 6,952,490 B2 | 10/2005 | Lee | |
| 6,993,164 B2 | 1/2006 | Jang | |
| 7,010,238 B2 * | 3/2006 | Park | H04N 1/40025 399/51 |
| 7,246,871 B2 | 7/2007 | Silverbrook | |
| 7,248,298 B2 | 7/2007 | Lee | |
| 7,280,779 B2 | 10/2007 | Fasen | |
| 7,630,285 B2 * | 12/2009 | Masuda | G11B 7/005 369/47.28 |

(Continued)

FOREIGN PATENT DOCUMENTS

| | | |
|---|---|---|
| CN | ZL02146245.3 | 6/2005 |
| CN | 101656299 A | 2/2010 |

(Continued)

*Primary Examiner* — Yosef Kassa
(74) *Attorney, Agent, or Firm* — Brouse McDowell; Heather M. Barnes; Michael G. Craig

(57) ABSTRACT

One or more techniques, devices and/or systems are disclosed for mitigating a perceived electrical sensation for a relief print scanning device. A current determination component can be used to identify an electrical current configuration that provides a mitigated electrical sensation to the user, for use with an electroluminescent-based relief print scanning device. The electrical current configuration can be identified using one or more image characteristics of a relief print image, which is captured by the devices using the current configuration. A current adjusting component, can be operably coupled with the current determination component, and may be used to adjust the current configuration, where the adjustment can be based on current adjustment data that is provided by the current determination component, based on the image characteristics.

20 Claims, 11 Drawing Sheets

(56) References Cited

U.S. PATENT DOCUMENTS

| | | | |
|---|---|---|---|
| 7,916,600 B2 * | 3/2011 | Masuda | G11B 7/005 369/44.13 |
| 7,929,031 B2 | 4/2011 | Nakayama | |
| 7,959,072 B1 | 6/2011 | Jenkins et al. | |
| 7,996,511 B1 * | 8/2011 | Wiese | G06F 9/5072 709/223 |
| 8,064,883 B2 * | 11/2011 | Liu | G06F 21/88 455/411 |
| 8,073,731 B1 * | 12/2011 | Rajasenan | G06Q 10/0637 705/7.38 |
| 8,120,510 B2 | 2/2012 | Davies | |
| 8,520,662 B2 | 8/2013 | Karaoguz et al. | |
| 8,570,273 B1 | 10/2013 | Smith | |
| 8,584,388 B1 * | 11/2013 | Fujisaki | F41A 17/08 42/70.01 |
| 8,601,597 B2 * | 12/2013 | Chan | G06F 12/1408 726/26 |
| 8,842,180 B1 | 9/2014 | Kasmir et al. | |
| 8,872,915 B1 | 10/2014 | Scalisi et al. | |
| 2002/0018252 A1 | 2/2002 | Lee et al. | |
| 2003/0183019 A1 | 10/2003 | Chae | |
| 2005/0031175 A1 | 2/2005 | Hara et al. | |
| 2005/0100196 A1 | 5/2005 | Scott et al. | |
| 2006/0159317 A1 | 7/2006 | Shyu et al. | |
| 2006/0269276 A1 | 11/2006 | O'Shea et al. | |
| 2007/0116331 A1 | 5/2007 | Rowe et al. | |
| 2007/0189588 A1 | 8/2007 | Kim et al. | |
| 2008/0273771 A1 | 11/2008 | Hsieh et al. | |
| 2008/0298650 A1 | 12/2008 | Jang et al. | |
| 2008/0316323 A1 | 12/2008 | Morita et al. | |
| 2009/0259588 A1 | 10/2009 | Lindsay | |
| 2010/0142790 A1 | 6/2010 | Chang | |
| 2012/0014569 A1 | 1/2012 | Frye et al. | |

FOREIGN PATENT DOCUMENTS

| | | |
|---|---|---|
| JP | 3544940 | 4/2004 |
| KR | 10-0285130 | 12/2000 |
| KR | 10-0290954 | 3/2001 |
| KR | 10-0290955 | 3/2001 |
| KR | 10-0302025 | 6/2001 |
| KR | 10-0302026 | 6/2001 |
| KR | 10-0305519 | 7/2001 |
| KR | 10-0309738 | 9/2001 |
| KR | 10-0324130 | 1/2002 |
| KR | 10-0343065 | 6/2002 |
| KR | 10-0345282 | 7/2002 |
| KR | 10-0345283 | 7/2002 |
| KR | 10-0348520 | 7/2002 |
| KR | 10-0349113 | 8/2002 |
| KR | 10-0349415 | 8/2002 |
| KR | 10-0350023 | 8/2002 |
| KR | 10-0378994 | 3/2003 |
| KR | 10-0380836 | 4/2003 |
| KR | 10-0436376 | 6/2004 |
| KR | 10-0439633 | 6/2004 |
| KR | 10-0460825 | 12/2004 |
| KR | 10-0465136 | 12/2004 |
| KR | 10-0466287 | 1/2005 |
| KR | 10-0467279 | 1/2005 |
| KR | 10-0560347 | 3/2006 |
| KR | 10-0879381 | 1/2009 |
| TW | 131132 | 9/2001 |
| TW | I228239 | 2/2005 |
| TW | I250464 B | 3/2006 |
| TW | 200834434 A | 8/2008 |

* cited by examiner

ANTI-SHOCK RELIEF PRINT SCANNING

CROSS-REFERENCE TO RELATED APPLICATIONS

This application is a continuation of, and claims priority to, U.S. Ser. No. 14/046,380, entitled ANTI-SHOCK RELIEF PRINT SCANNING, filed Oct. 4, 2013, which claims priority to U.S. Provisional Application Ser. No. 61/709,703 entitled ANTI-SHOCK RELIEF PRINT SCANNING, filed Oct. 4, 2012, the entire contents of both incorporated herein by reference.

BACKGROUND

A body-part relief image scanning device (scanner), such as a fingerprint recognition device, is used for a variety of purposes including security. A person's body-part can contact a surface of the scanner, where an image may be captured of the body-part, such as a finger print or some other biometric marker. The resulting image may be compared to a database of body-part images to verify the person's identity, for example. A body-part relief print image device may use an electrode-based, electro-luminescence component that can utilize an electrical connection between a relief object and the electro-luminescence component.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Accordingly, among other things, one or more techniques and/or systems are disclosed for mitigating a perceived electric shock to a user of a body-part relief print image device. As an example, a base current (e.g., an electrical current having a first current configuration) may be used to capture an initial image (e.g., a first image) of the body-part relief print, and, if based on an analysis of the resulting image, one or more subsequent images may be captured using modified current characteristics.

In one implementation, where a perceived electrical sensation may be mitigated for a relief print scanning device, a current determination component can identify a desired current configuration for electrical current that is provided to an electroluminescent-based relief print scanning device. In this implementation, the desired current configuration can be identified based on a first image characteristic of a first relief print image, where the first relief print image may be provided by the relief print scanning device while utilizing a first current configuration of the electrical current. Further, in this implementation, a current adjusting component, which is operably coupled with the current determination component, may adjust the first current configuration to a second current configuration; where the adjustment can be based on current adjustment data that is provided by the current determination component.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
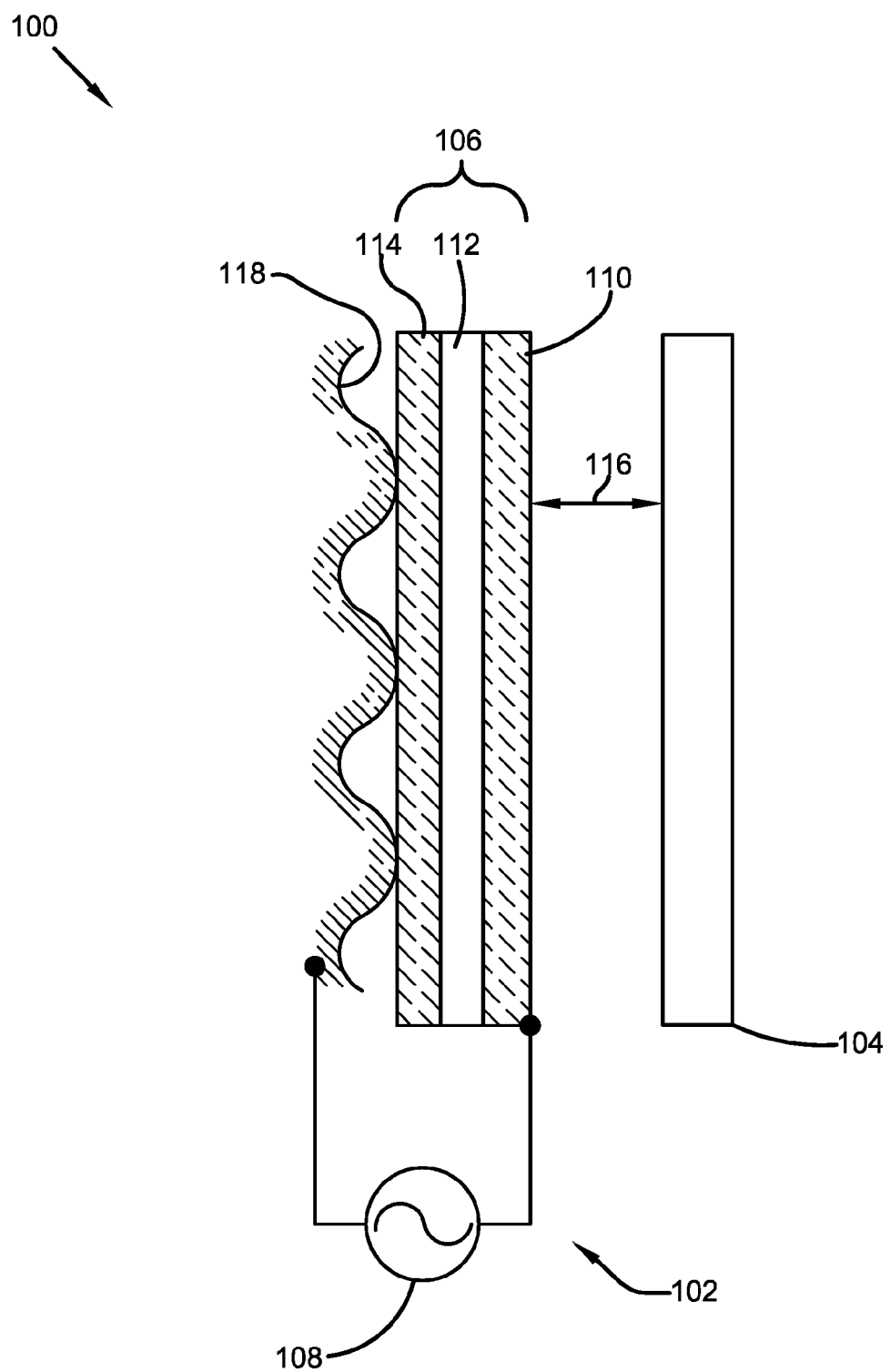
FIG. 1 is a component diagram illustrating an example body-part relief print recognition environment where one or more portions of one or more techniques and/or one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A user of a relief print scanner, for example, that comprises an electro-luminescent based film, typically places their finger on the surface of the scanner in contact with both the surface film and a contact electrode. As a non-limiting example, the contact electrode can be a source of electrical current that may be used to activate the electro-luminescent particles in the film, where the electrical current passes through the user's finger to the surface film. In one implementation, an electro-luminescent-based relief print scanning device may comprise an electro-luminescent based film that operates in a voltage range of about sixty to about six hundred volts (e.g., 60-600 VAC), inclusive. In this example, a user of this type of scanner may perceive an electrical sensation (e.g., electrical shock), which, in some instances, may be somewhat uncomfortable. In one implementation, the perceived electrical sensation may be reduced by reducing one or more characteristics of the electrical current (e.g., voltage and/or frequency), thereby improving the user's comfort during use.

FIG. 1 is a component diagram illustrating an example body-part relief print recognition environment 100 where one or more portions of one or more techniques and/or one or more systems described herein may be implemented. As shown in the example environment 100, an example body-part relief print recognition system, such as a fingerprint recognition system, may comprise a relief print generator 102. The example body-part relief print recognition system may further comprise a sensor arrangement 104. In one implementation, the sensor arrangement 104 may comprise image sensor that can convert an optical image into an electronic signal, for example, for digital processing of a captured optical image. As one example, the sensor arrangement 104 may comprise an active pixel sensor (APS), such as a thin film sensor (e.g., thin film photo-transistor, thin film photo-diode) or complementary metal-oxide semiconductor (CMOS). As another example, the sensor arrangement 104 may comprise a charge-coupled device (CCD), or some other imaging sensor that can convert photons into an electrical signal.

In one implementation, the relief print generator 102 may comprise an electrode-based (e.g., single electrode), electro-luminescence component 106, and/or an electrical connection 108 (e.g., a power source, such as an A/C source), which may provide an electrical connection between a relief object 118 and the electro-luminescence component 106. Further, in one implementation, the electrode-based, electro-luminescence component 106 may comprise a transparent electrode 110 (e.g., comprising an indium tin oxide (ITO) material, which may be attached to a polymer substrate), a luminescent layer 112, and/or a dielectric layer 114 (e.g., a conductive/insulating layer that allows current to pass). In one implementation, the relief print generator 102 and the sensor arrangement 104 may be separated at a distance 116 to each other or may be arranged such that the sensor arrangement 104 is in contact with the relief print generator 102. As one example, when a relief print recognition system is activated (e.g., by placing a finger at an image capture location), light produced by the luminescent layer 106 is emitted in respective directions, such as directed toward the sensor arrangement 104.

Figure 2A:
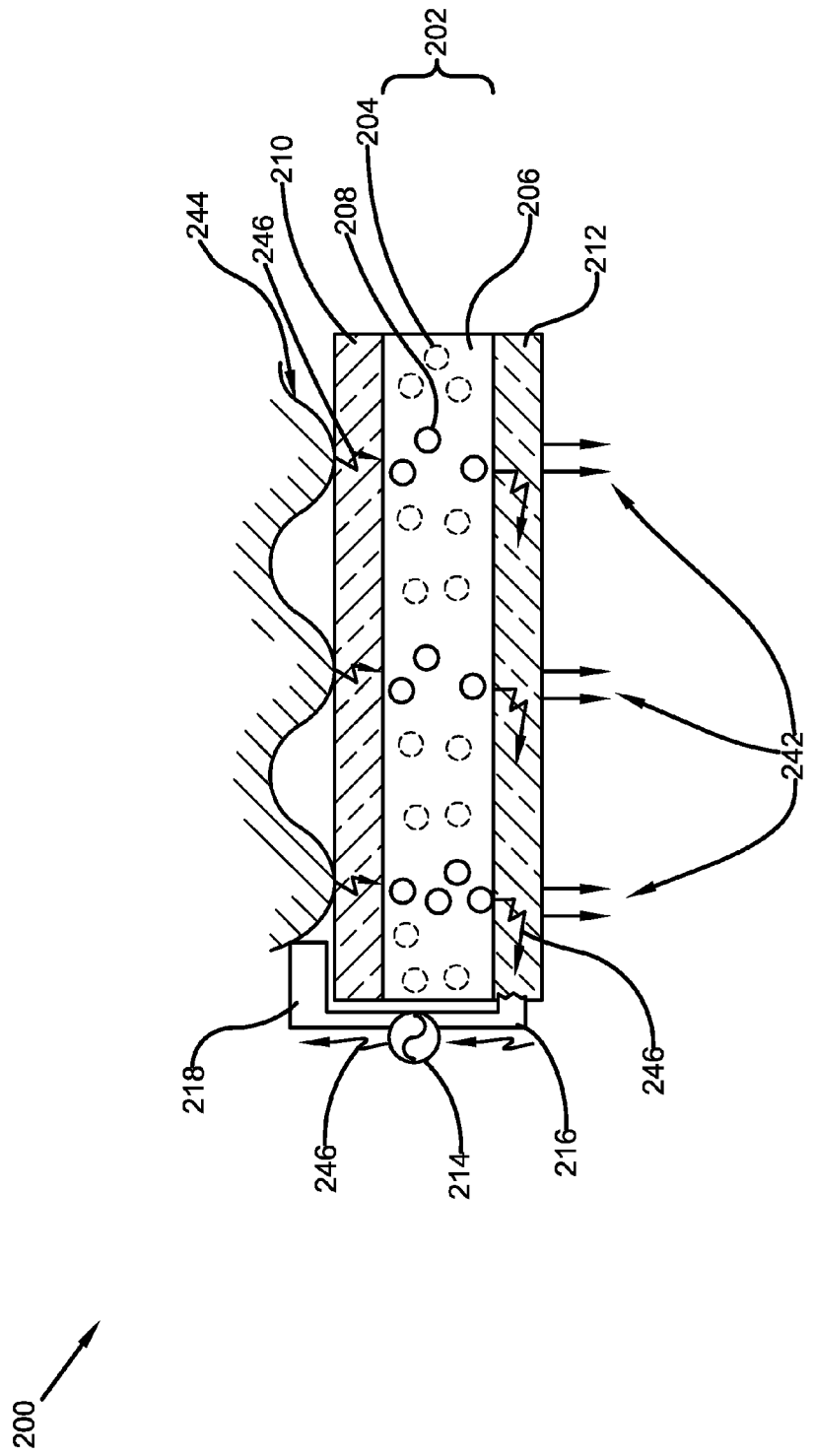
FIGS. 2A and 2B illustrate example implementations where one or more portions of one or more techniques described herein may be implemented.
Figure 2B:
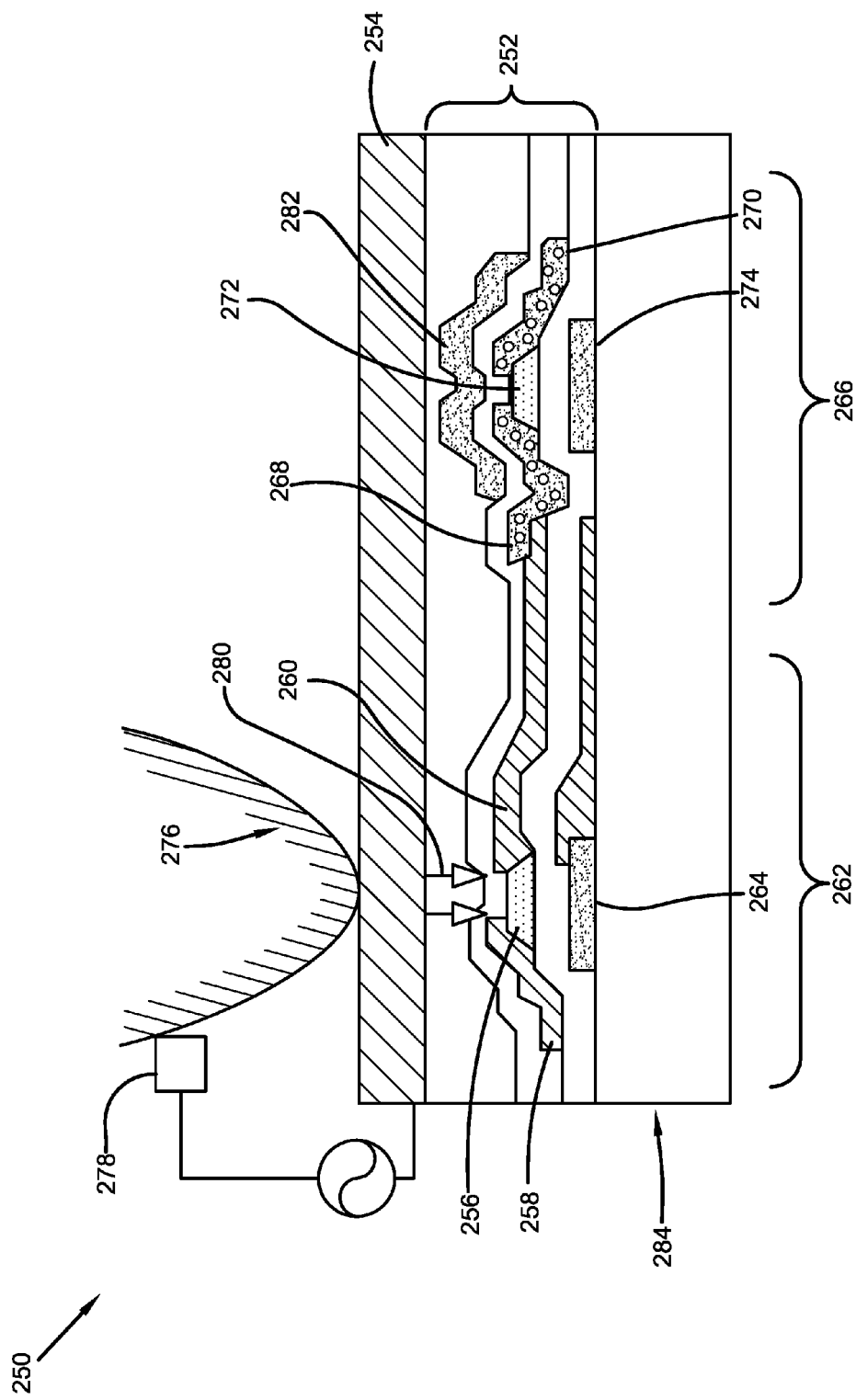
Figure 3A:
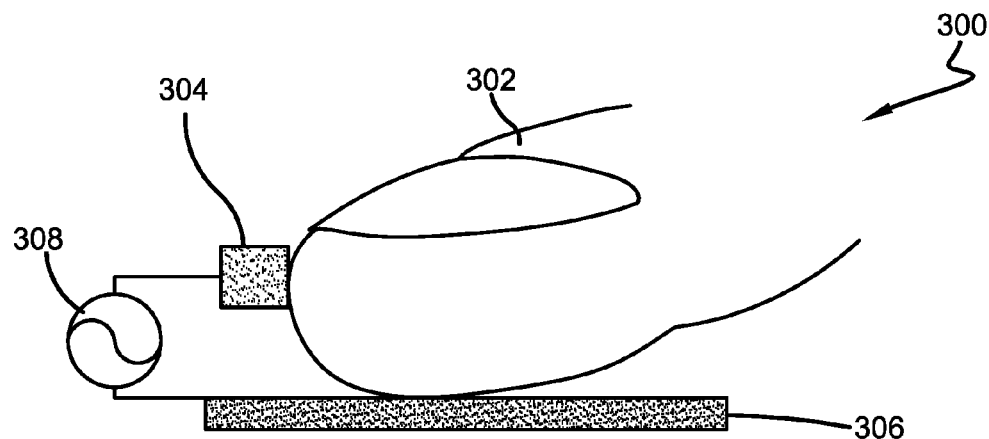
FIGS. 3A, 3B, 3C, and 3D are component diagrams illustrating example implementations where one or more portions of one or more techniques described herein may be implemented.
Figure 3B:
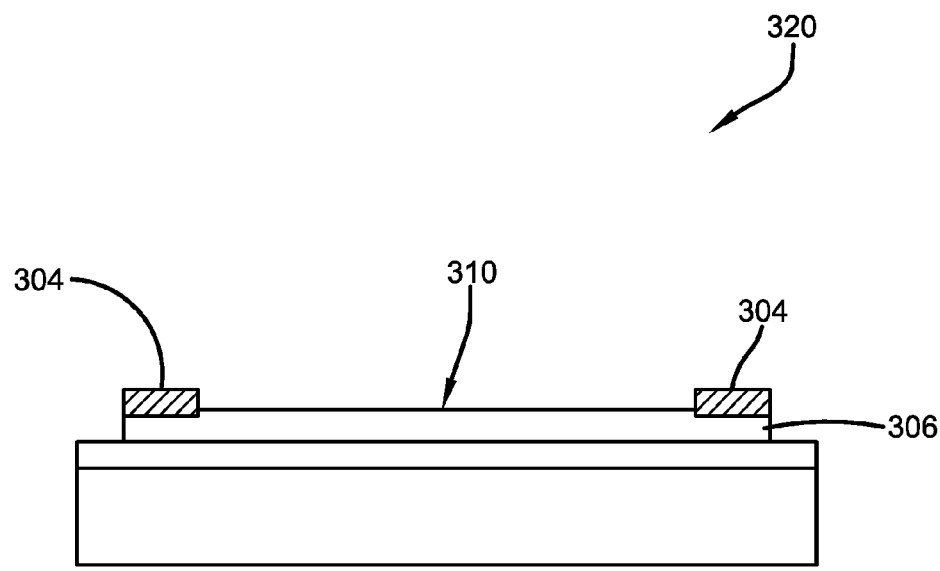
Figure 3C:
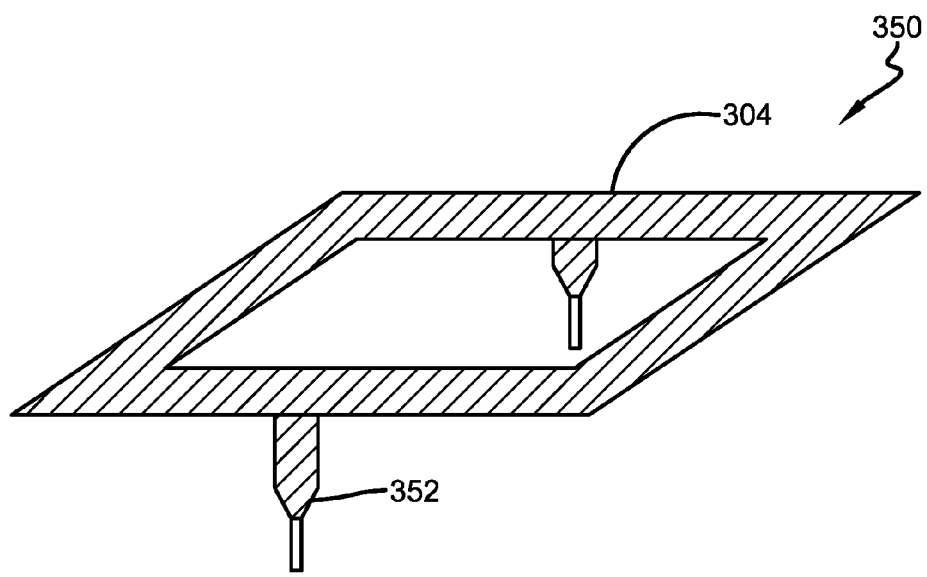
Figure 3D:
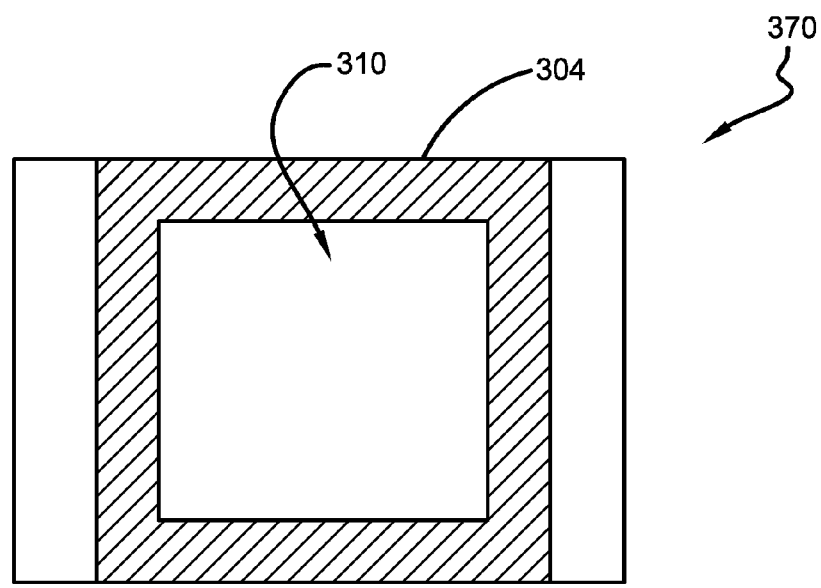

FIGS. 2A and 2B are component diagrams illustrating example implementations 200, 250 where one or more portions of one or more techniques and/or one or more systems described herein may be implemented. The example implementation 200 may comprise a portion of a luminescent element (e.g., 102 of FIG. 1) that can be utilized in a relief print scanner/sensor and the example implementation 250 may comprise a portion of a relief print scanner/sensor.

In FIG. 2A, an example implementation of a portion of a luminescent element 200 can comprise a light emitting layer 202, such as an electro-luminescence layer. In this implementation 200, the light emitting layer can be comprised of fluorescent particles 204 and a binder material 206. In one implementation, the electro-luminescent particles 204 may comprise activated particles 208, such as when subjected to an electrical current 246. Further, in this implementation, the activated particles 208 may emit photons 242, for example, thereby producing light when subjected to the electrical current 246.

In FIG. 2A, the example implementation of the portion of the luminescent element 200 can comprise a dielectric layer 210, and a transparent electrode 212. In this example implementation 200, the dielectric layer 210 is resident over the top portion of, and in contact with, the light emitting layer 202; and the transparent electrode 212 is resident under the bottom portion of, and in contact with, the light emitting layer 202. Further, the example implementation of the portion of the luminescent element 200 can comprise a power source 214, such as an alternating current (AC) power source, having an electrode connection 216 in electrical connection with the transparent electrode 212, and a contact electrode 218 (e.g., an object contact electrode) residing substantially adjacent to, a contact surface (e.g., top surface) of the dielectric layer 210.

In one implementation, a relief object 244 may contact both the contact surface of the dielectric layer 210 and the contact electrode 218. In this implementation, for example, upon contacting both the dielectric layer 210 and the object contact electrode 218, an electrical circuit may be created between the contact electrode 218 and the transparent electrode 212, thereby allowing current 246 to flow between the two electrodes. Further, in this implementation, those portions of the relief object 244 (e.g., body-part relief ridges) that come in contact with the contact surface of the dielectric layer 210 can allow current 246 to pass from the contact electrode 218 to the dielectric layer 210. Additionally, the current 246 passing through the dielectric layer can activate the fluorescent particles 204 merely at the location of the contact. Upon activation, the activated particles 208 may emit photons 242 merely at the location of the contact of the portions of the relief object 244 (e.g., fingerprint ridges). In this way, for example, an illuminated relief print (e.g., fingerprint) of the relief object 244 (e.g., finger) may be produced when the relief object 244 contacts both the contact electrode 218 and the contact surface of the dielectric layer 210.

As shown in FIG. 2B, a relief print scanner can comprise an image sensor portion 252, that may be used to capture an optical image (e.g., an image of a fingerprint) by converting incoming photons into an electronic signal, for example, for later digital processing of the captured image. In one implementation, the image sensor portion 252 may comprise a thin film sensor array. For example, a thin film sensor-array may be used to detect photons emitted by a light emitting component 254 (e.g., the luminescent element 200 of FIG. 2A). Here, as an example, the image sensor portion 252 can detect light produced by the light emitting component 254 (e.g., produced in the form of a relief print) and produce an image using a photo-current, by converting the detected photons into an electrical signal.

In the example implementation 250, a photo-sensitive layer 256 (e.g., comprising SiH, amorphous silicon) may be formed between a first source electrode 258 and a first drain electrode 260 of a light sensing unit 262. When an electrical charge is applied to a first gate electrode 264, the photo-sensitive layer 256 becomes responsive to light, for example, where the photo-sensitive layer 256 may become electrically conductive when incident to photons of light. As one example, when light is incident on the photo-sensitive layer 256 over a predetermined, threshold light amount, the first source electrode 258 and the first drain electrode 260 may become electrically connected. Therefore, in this example, light generated from the light emitting component 254 (e.g., comprising a fingerprint pattern) may be received by the photo-sensitive layer 256, which may cause an electrical signal to pass from the first source electrode 258 to the first drain electrode 260 (e.g., providing an electronic signal indicative of the light received).

Further, a switching unit 266 of the image sensor portion 252 can comprise a second source electrode 268, a second drain electrode 270 and an intrinsic semiconductor layer 272. As one example, when a negative charge is applied to a second gate electrode 274, the intrinsic semiconductor layer 272 may become electrically conductive, thereby allowing the electrical signal created at the light sensing unit 262 to pass from the second source electrode to the second drain electrode (e.g., and to an electrical signal reading component for converting to a digital image). In this way, for example, the switching unit 266 may be used to control when an electrical signal indicative of a particular amount of light may be sent to an electrical signal reading component (e.g., for processing purposes and/or to mitigate signal interference with neighboring light sensing units).

Additionally, in this implementation 250, a light shielding layer 282 may be resident over the top portion of the switching unit 266. As one example, the light shielding layer 282 may mitigate intrusion of light to the intrinsic semiconductor layer 272, as light can affect the electrical conductivity of the intrinsic semiconductor layer 272. The image sensor portion 252 may also comprise a substrate 284 of any suitable material, onto which the layers of the image sensor portion 252 may be formed. As one example, when a relief object 276 (e.g., 244 of FIG. 2A) comes into contact with a contact electrode 278 and a contact surface (e.g., top surface) of the light emitting component 254, an electrical current may pass from the contact electrode 278, through the relief object 276, and into the light emitting component 254. In this example, the light emitting component 254 may emit photons 280 that are incident to the photo-sensitive layer 256, thereby allowing an electrical signal (e.g., indicative of the number of photons received) to pass from the first source electrode 258 to the second drain electrode 270, and to a signal reading component.

FIGS. 3A, 3B, 3C, and 3D are component diagrams illustrating example implementations 300, 320, 350, 370 where one or more portions of one or more techniques described herein may be implemented. As described in FIG. 2A, when a charge 308 is applied to a contact electrode 304, and the relief print object 302 (e.g., finger) contacts the contact electrode 304, the charge may move through the relief print object 302, to a transparent electrode (e.g., 212 of FIG. 2A) comprised in an electro-luminescence component (e.g., 106 of FIG. 1).

In the implementations 320, 350 and 370, the contact electrode 304 can comprise a conductive element disposed at least partially around a perimeter of a print scanning surface 310. In this way, for example, when a relief object 302 is applied to the print scanning surface 310 at least a portion of the relief object 302 may contact the contact electrode 304. In the example implementation 350 of FIG. 3C, the contact electrode 304 can comprise one or more electrode connections 352 (e.g., 216 of FIG. 2A). As one example, the one or more electrode connections 352 may electrically couple with the current generator 308, which may further couple with the transparent electrode. Further, the shape, design, location of the contact electrode 304 is not limited to those illustrated in the example implementations; for example, the contact electrode 304 may comprise any shape (circle, square, rectangle, dot, line, grid, etc.) appropriate for the application, and/or may be located merely at one portion (e.g., side, corner, etc.) of the surface.

As provided herein, a system may be devised that provides for mitigating a perceived electrical current for a relief object scanner. As an example, a perceivable current for a human may depend on the current type (e.g., alternating or direct) and/or a current frequency (e.g., in Hertz (Hz)). For example, as little as 1 milliampere (mA) of alternating current (AC) (e.g., 5 mA of direct current (DC), 12 mA of AC at 10 kHz) may be perceived by a person at 60 Hz, resulting in a perceived electrical shock. While these types of electrical shocks typically present little or no danger to a person, they may be uncomfortable to the scannee whose relief prints are being scanned.

In one aspect, a reduction in the voltage for the relief object scanner device may be implemented, for example, where an amount of reduction may be based on circumstances at a time of relief object scanning. Further, the current used to scan a relief object may be increased, for example, merely at the time the relief object contacts a scanning surface of the relief object scanner device. In one implementation, data, indicative of one or more relief object scanning variables, may be collected and processed at the time of relief object scanning. In this implementation, the data may be used to identify a desired voltage and/or current (e.g., or some other characteristic of current, such as resistance, electrical impedance, frequency, and/or amperage) for the scanning that can provide a more comfortable experience to the scannee, while also providing a desired image quality for the resulting image of the relief object.

Figure 4:
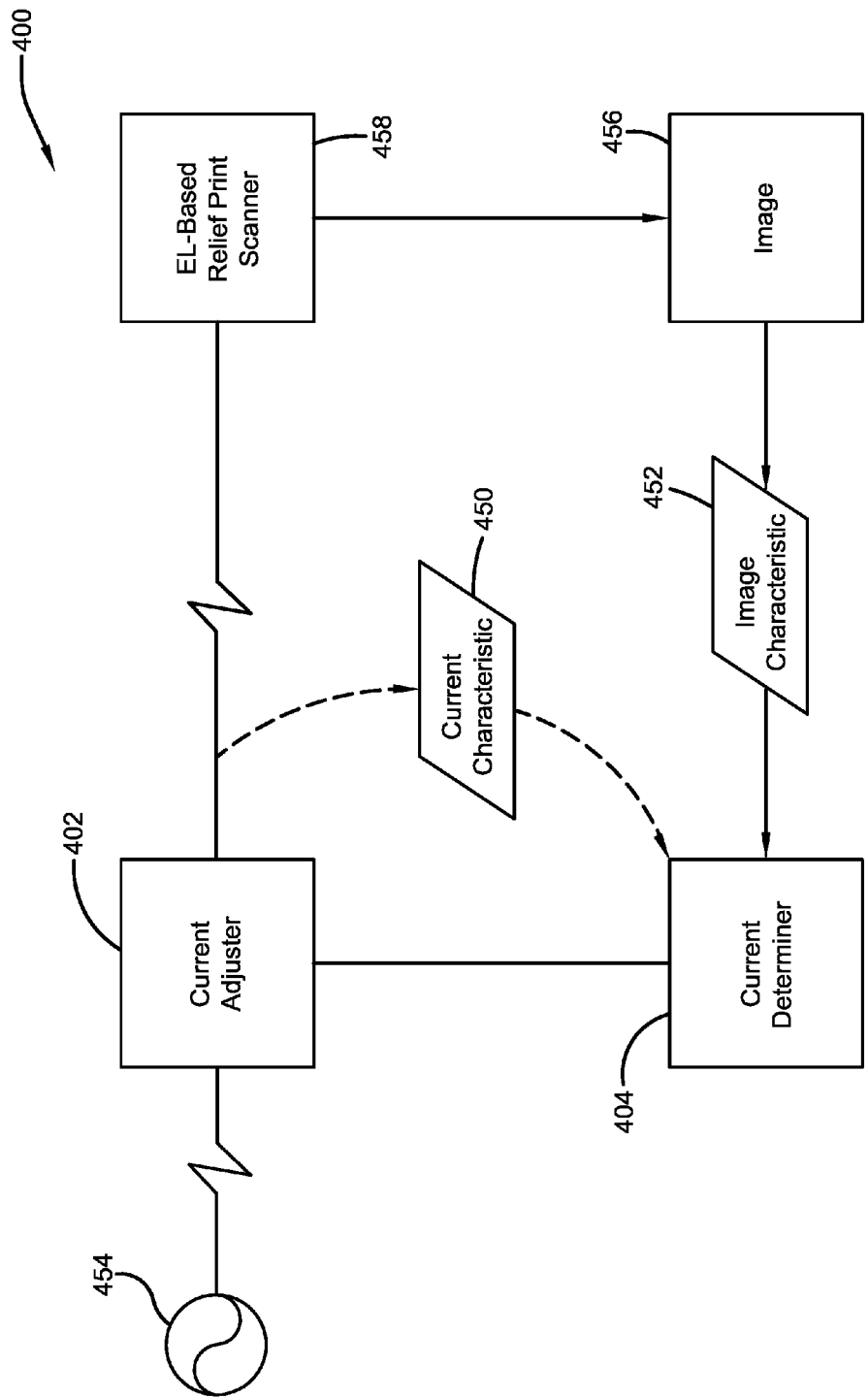
FIG. 4 is a component diagram illustrating an exemplary system for mitigating perceived electrical sensation for a relief print scanning device.

FIG. 4 is a component diagram illustrating an exemplary system 400 for mitigating perceived electrical sensation for a relief print scanning device. In the exemplary system 400, a current determination component 404 is operably coupled with a current adjusting component 402. The current determination component 404 is configured to identify a desired electrical current characteristic 450 for electrical current 454 provided to an electroluminescent-based relief print scanning device 458 based at least upon a first image characteristic 452 of a first relief print image 456. The first relief print image 456 is provided by the relief print scanning device 458 utilizing a first current configuration of the electrical current 454;

In the exemplary system 400, the current adjusting component 402 is operably coupled with the current determination component 404. The current adjusting component 402 is configured to adjust the first current configuration, resulting in a second current configuration, based at least upon current adjustment data provided by the current determination component 404. In one implementation, the current adjusting component 402 can adjust at least one characteristic 450 of the electrical current 454 provided to the electroluminescent-based relief print scanning device 458, resulting in an adjusted current configuration.

Figure 5:
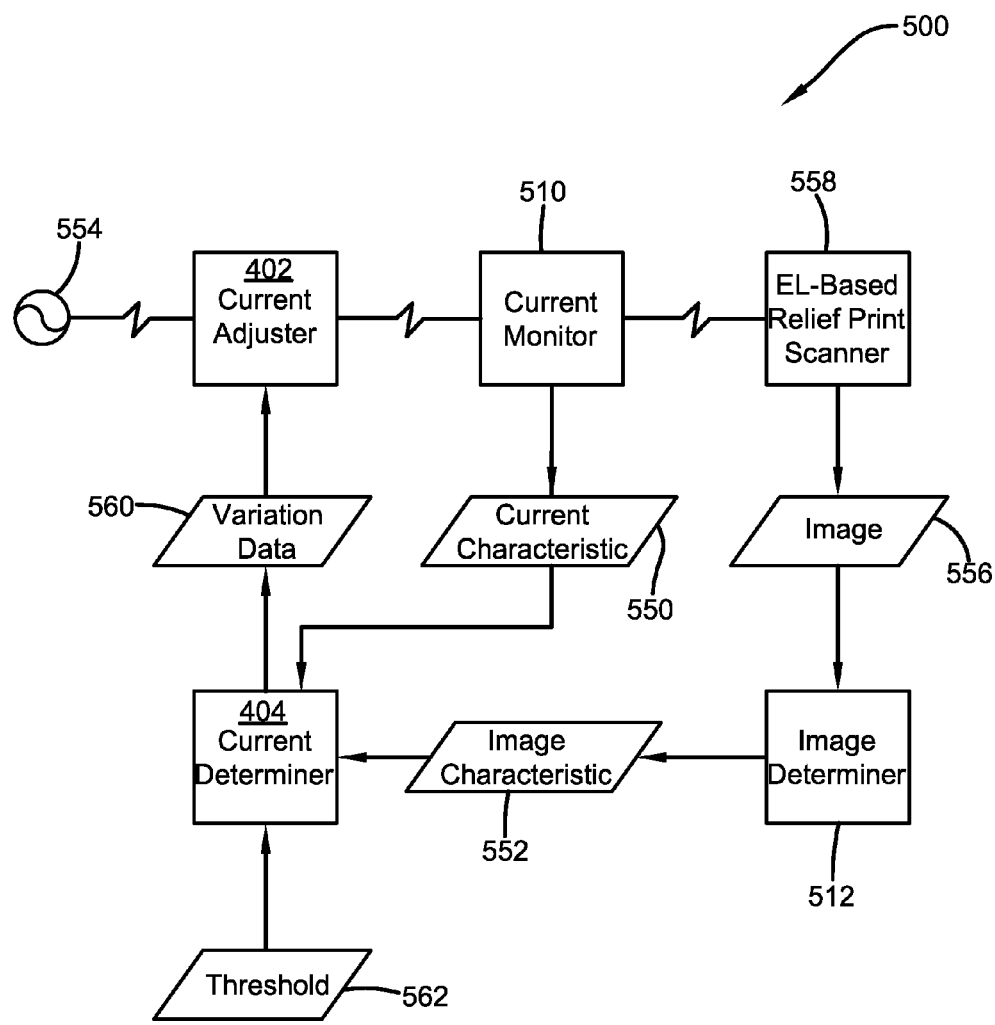
FIG. 5 is a component diagram illustrating an example implementation where one or more portions of systems described herein may be implemented.

FIG. 5 is a component diagram illustrating an example implementation 500 where one or more portions of systems described herein may be implemented. In this example 500, an extension of FIG. 4 is provided and thus description of elements, components, etc. described with respect to FIG. 4 may not be repeated for simplicity. In the example implementation 500, a current monitoring component 510 may be electrically coupled with an electrical current provider 554 (e.g., providing alternating current (AC)), and it may be disposed electrically downstream from the current adjusting component 402. In one implementation, the current monitoring component 510 can be configured to identify the first current configuration of the electrical current provided 554 to a relief print scanning device 558.

For example, one or more current characteristics may include a voltage, amperage, frequency, resistance, and/or impedance. As one example, decreasing (or increasing) an amount of voltage provided to the relief print scanning device 558 may also decrease (or increase) a perceived electrical shock felt by a user of the relief print scanning device 558. Therefore, in this example, the current configuration comprising a particular amount of voltage provided to the relief print scanning device 558 may be identified by the current monitoring component 510, and this current characteristic 550 (e.g., voltage level) may be provided to the current determination component 404. In one implementation, one or more current characteristics 550 comprised in the current configuration (e.g., first current configuration) may be identified and provided to the current determination component 404 by the current monitoring component 510. For example, one or more of the provided current's voltage, amperage, frequency, resistance, and/or impedance may be identified for the first current configuration.

In the example implementation 500 of FIG. 5, an image determination component 512 may be configured to identify one or more image characteristics 552 (e.g., a first image characteristic) of a relief print image 556 (e.g., the first relief print image) provided by the relief print scanning device 558. As one example, the relief print scanning device 558 may capture a relief print image 556 using the provided current 554 having the first current configuration, and the image determination component 512 can identify one or more image characteristics 552 from the relief print image 556. Further, the one or more image characteristics 552 may be provided to the current determination component 404, which may have also received the one or more identified current characteristics 550 (e.g., comprised in the first current configuration), for example, for the provided current 554 (e.g., the first current configuration) used to produce the relief print image 556.

In one implementation, one or more image characteristics 552 may include brightness, contrast, edge detection, object detection, luminance, luma, noise, and/or chrominance. As one example, decreasing (or increasing) an amount of voltage (e.g., and/or one or more other current characteristics) provided to the relief print scanning device 558 may also decrease (or increase) a brightness of a resulting relief print image 556 from the relief print scanning device 558. Therefore, in this example, an amount of brightness (e.g., 552) in the relief print image 556 may be identified by the image determination component 512, and this image characteristic 552 can be provided to the current determination component 404. In one implementation, one or more image characteristics 552 may be identified and provided to the current determination component 404.

With continued reference to FIGS. 1-5, in one implementation, the current determination component 404 can be configured to compare an image characteristic 552 (e.g., the first image characteristic) of a relief print image 556 (e.g., the first relief print image) with a corresponding image characteristic threshold 562, resulting in current adjustment data 560 if the image characteristic 552 does not meet the corresponding image characteristic threshold 562. Further, in one implementation, the corresponding image characteristic threshold 562 can be indicative of a relief print image 556 that comprises data usable for relief print recognition.

In one implementation, the current determination component 404 can be configured to identify the current adjustment data, where the current adjustment data comprise an indication to the current adjusting component 402 to adjust the current 554 to an adjusted current configuration (e.g., the second current configuration). That is, for example, the current monitoring component 510 (e.g., an electrical sensor or transducer) can identify the first current configuration for the current 554, comprising predetermined levels for current characteristics 550 such as voltage, resistance, electrical impedance, frequency, and/or amperage. In this example, the relief print scanner 558 can capture a first image (e.g., 556) using the current having the first current configuration. The image determination component 512 can identify one or more first image characteristics (e.g., 552), such as brightness, contrast, edge detection, object detection, luminance, chrominance, noise, and or luma, and provide them to the current determination component 404. The current determination component 404, in this example, may compare the one or more first image characteristics 552 to corresponding image threshold values 562 to determine whether the image comprises a usable image for relief print recognition (e.g., bright enough, enough contrast, appropriate edges, objects, low noise, etc.).

Further, in this example, if one or more threshold values are not met by the first image characteristic(s) 552, the current determination component can determine current variation data 560. For example, the current variation data 560 may comprise information indicative of an adjustment for one or more of the current characteristics, resulting in a second current configuration. For example, the second current configuration may comprise a change in voltage (e.g., increase) to a predetermined second voltage level; a change in resistance (e.g., decrease) to predetermined second resistance level; a change in electrical impedance (e.g., decrease) to a predetermined second impedance level; a change in frequency (e.g., increase) to a predetermined second frequency level; and/or a change in amperage (e.g., increase) to a predetermined second amperage level.

Further, in this example, the change to the second current configuration may be adjusted by the current adjusting component 402, thereby providing adjusted electrical current 554 to the relief print scanner 558 during capture of a second relief print image 556. Again, the second relief print image 556 can be analyzed, for example, by the image determination component 512 to identify one or more second image characteristics 552, which can be compared to the one or more image characteristic thresholds 562 by the current determination component 404. If the one or more second image characteristic thresholds 562 meet the respective image characteristic thresholds 562, the second relief print image 556 may be used, for example, for relief print recognition (e.g., security, identification, etc.) and/or for storage (e.g., image collection). Alternately, if the one or more image thresholds 562 are not met, the process may be iterated to create a third current configuration, a third relief print image, etc. (e.g., and a fourth, fifth, etc. until a desired image is captured).

In one implementation, the first current configuration of the electrical current 554 can comprise an available configuration in an operating range for the electro-luminescent based film disposed in the electroluminescent-based relief print scanning device 558 that provides a desired level of perceived electrical sensation to a user. That is, for example, the initial setting for the current configuration may comprise the lowest voltage (e.g., or other current characteristic 550) in an operating range for the relief print scanner 558. In this way, for example, there is a higher chance that the user may be provided a more comfortable image capture experience.

Further, in one implementation, the second current configuration can comprise a next available configuration in the operating range for the electro-luminescent based film that provides a next level of perceived electrical sensation to the user. That is, for example, if the first current configuration does not provide a useable image, the second current configuration (e.g., comprise a next higher level of voltage) may be able to provide the usable image, while still remaining at a low enough level to mitigate the electrical sensation to the user. In this way, for example, the electrical characteristics may be stepped up sequentially, at least until a usable image is obtained; thereby providing an electrical current configuration to the user that has a least perceived electrical sensation.

As provided herein, a method may be devised that provides for mitigating a perceived electrical current for a relief object scanner. As one example, a reduction in the voltage (e.g., or a change in some other current characteristic) for the relief object scanner device can be used to reduce the perceived electrical shock. For example, the reduction of voltage (e.g., or change of current) can be based on characteristics of a resulting image. Further, the current can be altered at the time the relief object contacts the scanning surface of the relief object scanner device.

Figure 6:
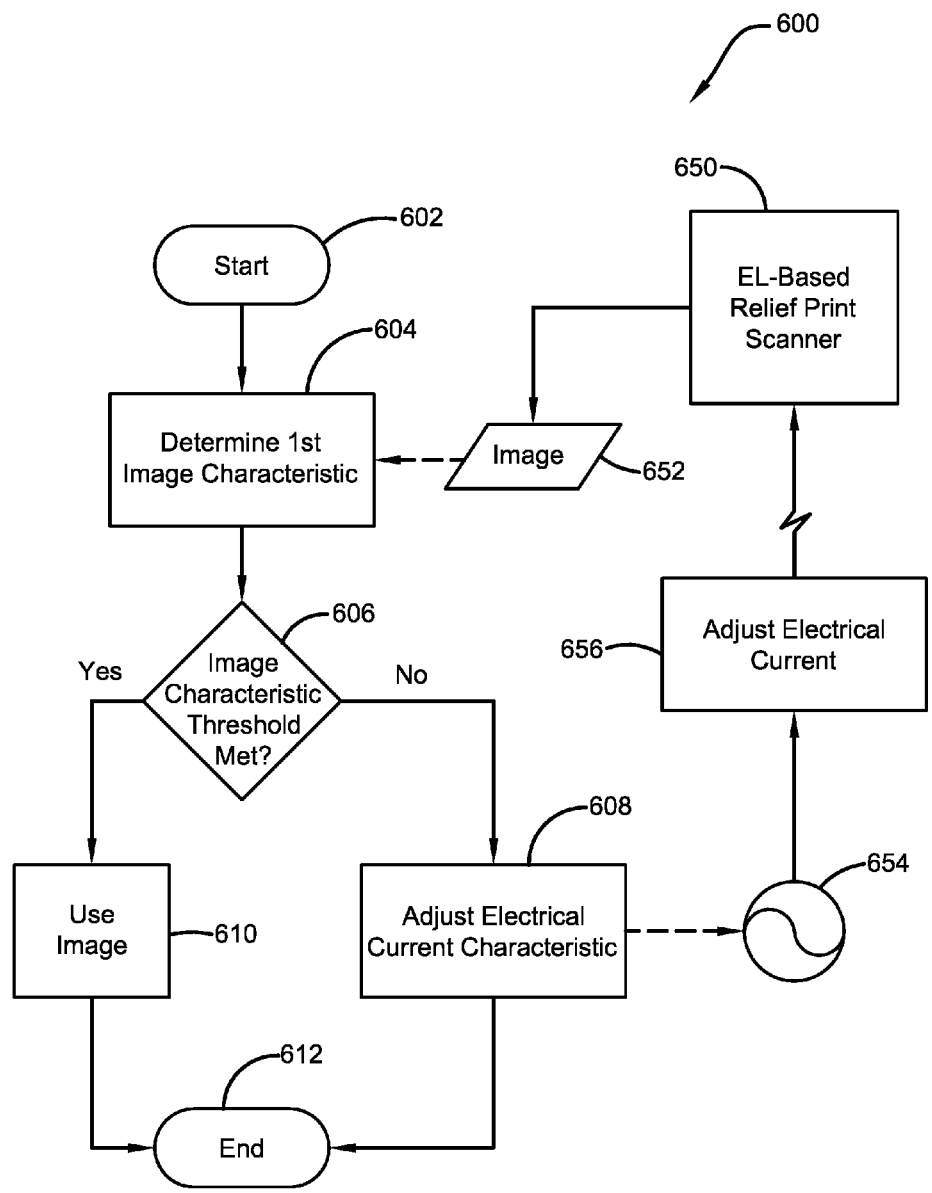
FIG. 6 is a flow diagram illustrating an exemplary method for mitigating perceived electrical sensation for a relief print scanning device.

FIG. 6 is a flow diagram illustrating an exemplary method 600 for mitigating perceived electrical sensation for a relief print scanning device. The exemplary method 600 begins at 602. At 604, a first image characteristic can be determined for a first relief print image 652 that is captured by an electroluminescent-based relief print scanning device 650. The electroluminescent-based relief print scanning device 650 utilizes a first electrical current configuration during the capture of the first relief print image 652. At 606, the first image characteristic may be compared with a first image characteristic threshold. If the first image characteristic meets (e.g., or exceeds) the first image characteristic threshold (YES at 606), the resulting image may be used (e.g., for relief print recognition purposes), at 610.

If the first image characteristic does not meet the first image characteristic threshold (NO at 606), an electrical current characteristic of the first current configuration may be adjusted, at 608, resulting in a second electrical configuration. Here, at least a portion of the resulting second current configuration, comprising the adjusted electrical current 656, can be used to capture a second relief print image 652, using the electroluminescent-based relief print scanning device 650. For example, an electrical current providing component 654 may adjust an output of the electrical current 656, based on the adjusted electrical current characteristics, at 608. The adjusted electrical current 656 may be used by the electro-luminescent relief print scanner 650 to capture an image 652 of the relief print object (e.g., fingerprint). In one implementation, the process 604-608 may be iterated, at least until one or more image characteristics meet the desired threshold at 606. Having met the desired threshold at 606, and using the image, at 610, the exemplary method 600 ends at 612.

Figure 7:
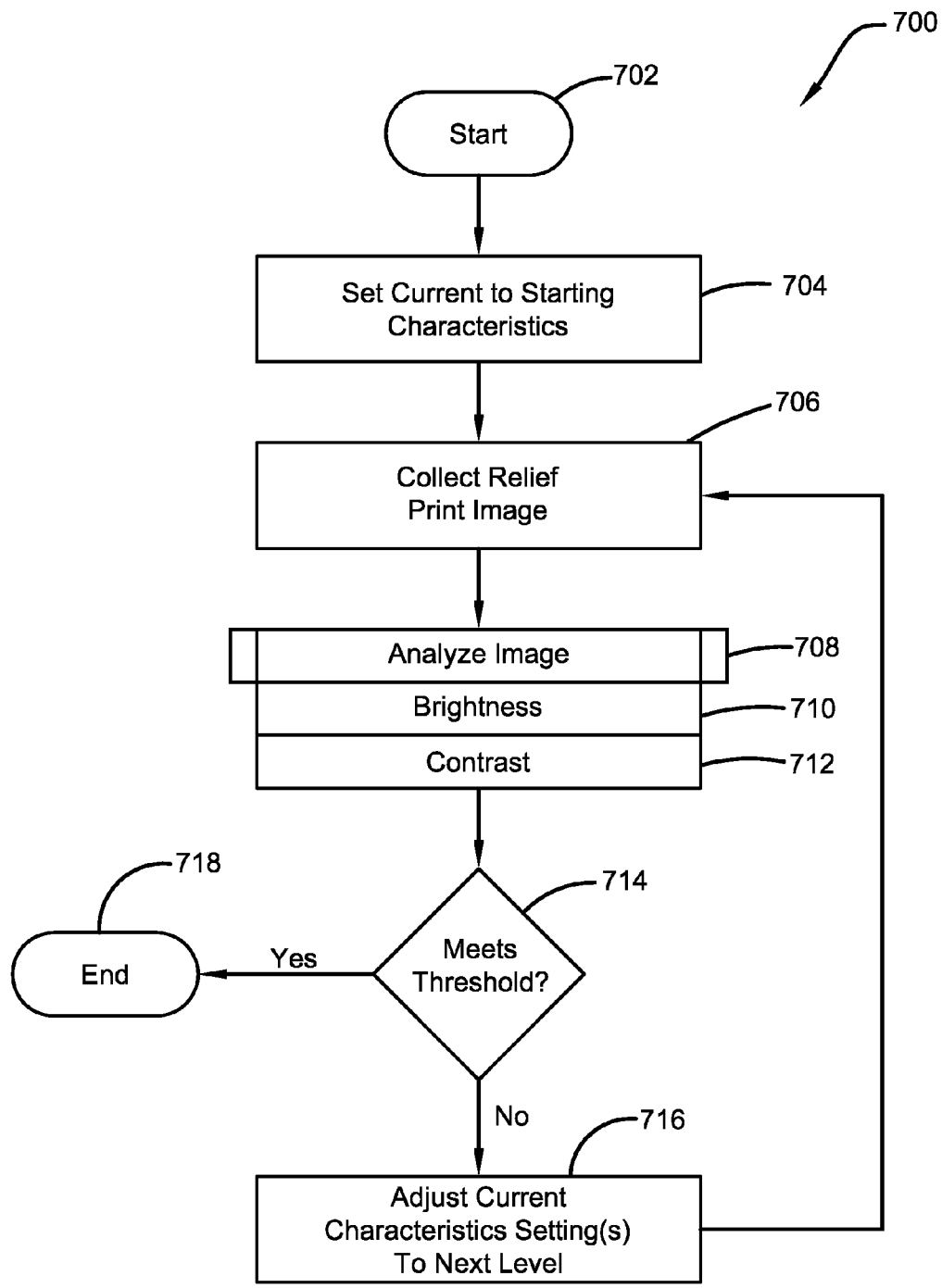
FIG. 7 is a flow diagram illustrating an example implementation where one or more portions of one or more techniques described herein may be implemented.

FIG. 7 is a flow diagram illustrating an example implementation 700 where one or more portions of one or more techniques described herein may be implemented. The exemplary method 700 begins at 702. At 704, an electrical current (e.g., 654 of FIG. 6) that is used by a relief print scanning device (e.g., 650 of FIG. 6) can be set to a starting configuration (e.g., a first configuration, such as an initial configuration setting). In one implementation, the electroluminescent-based relief print scanning device can be set to a first electrical current configuration, where the first electrical current configuration comprises an available configuration in an operating range for an electro-luminescent based film disposed in the electroluminescent-based relief print scanning device that provides a desired level (e.g., least) of perceived electrical sensation to a user.

As one example, the relief print scanning device may have a baseline standard for a current configuration, comprising a baseline set of current characteristics, where the baseline set of current characteristics comprise a desired current level (e.g., providing a lowest perceived electrical sensation to a user) that may still yield a useable image (e.g., one that can be used to identify/match the resulting print with a database print). In one implementation, the current provided to the device may be set at the device's baseline standard (e.g., comprising the lowest voltage, frequency, amperage, and/or highest resistance, or impedance). In this implementation, for example, the baseline current characteristics may mitigate the perceived electrical shock to the user.

At 706 in the example implementation 700, a relief print image may be captured using the provided current (e.g., the first electrical configuration set to the baseline). As described above, an electrical current is supplied to a contact electrode, which can be contacted by the scannee (e.g., user) when touching the scanning surface of the device, for example. In this example, the provided current can be used to create an image of the relief print (e.g., as described in FIGS. 2A and 2B), at the starting electrical configuration (e.g., the baseline standard). Further, in one implementation, the current may be provided to the contact electrode merely at the moment the relief print object contacts both the scanning surface and the contact electrode, such as by a current provider (e.g., 108 of FIG. 1, 214 of FIG. 2A, 308 of FIG. 3A, 454 of FIG. 4, and/or 554 of FIG. 5) that is configured to provide electrical current to the contact electrode (e.g., 218 of FIG. 2A, 278 of FIG. 2B, and/or 304 of FIGS. 3A-3D). In this way, in this example, a perceived electrical shock may be mitigated, as the current may not build up at the contact electrode prior to imaging (e.g., which can result in a higher perceived electrical shock).

At 708, a resulting image can be analyzed. As described above, the relief print device can produce an image of the relief print, where the initial image (e.g., first relief print image 456 of FIG. 4) can comprise image characteristics, for example, which may be associated with the current configuration used to produce the image. As one example, a particular voltage and/or frequency may yield a particular image brightness and/or contrast for the image, which may also be affected by environmental conditions at the time of collection (e.g., temperature, humidity, dryness of object, cleanliness of object and/or scanner, etc.). In this implementation 700, the image brightness may be analyzed, at 710, and the image contrast can be analyzed, at 712. Image brightness and image contrast are merely two of a plurality of image characteristics that may be used to characterize an image's quality (e.g., edge detection, object detection, luminance, luma, and/or chrominance), and the subject matter described herein is not limited only to those implementations described herein.

At 714, the one or more image characteristics, identified at 708, can respectively be compared against an associated threshold. In one implementation, the analysis can comprise comparing the first image characteristic with a first image characteristic threshold, to determine whether the image characteristic meets the desired threshold. As one example, an image's brightness level and/or contrast level may affect the device's ability to detect the relief print, and/or compare the print against a comparison database of prints. Therefore, for example, an image brightness level threshold and/or an image contrast level threshold may be compared against the one or more image characteristics identified for the image. As an example, an image brightness for an image may comprise and average (e.g., or some other suitable statistic) brightness value for the respective pixels in the image. As another example, likewise, the image contrast for an image may comprise and average (e.g., or some other suitable statistic) contrast value for the respective contrasting pixels in the image.

In one implementation, comparing the first image characteristic with the first image characteristic threshold can comprise determining whether the first relief print image comprises data that is usable for relief print recognition. That is, for example, if the image does not comprise a desired number of relief print edges or objects (e.g., indicative of the ridges of a fingerprint), the image may not be useable for relief print recognition (e.g., comparison, storage and identification).

If the one or more image characteristics meets (e.g., or exceeds) their corresponding image characteristic threshold (YES at 714), the example implementation 700 can end, at 718, for example, and the resulting image may be utilized by the relief print object scanning device (e.g., for storage and/or identification). If the one or more image characteristics does not meet their corresponding image characteristic threshold (NO at 714), the starting current settings for the relief print object scanning device may be adjusted to a next level, at 716. In one implementation, a second electrical current configuration can be identified, if the first image characteristic does not meet the first image characteristic threshold.

In one implementation, identifying the second electrical configuration can comprise adjusting the electrical current configuration to a next available configuration in the operating range for the electro-luminescent based film that provides a next level of perceived electrical sensation to the user. In this implementation, one or more characteristics of the electrical configuration may be identified for adjustment, including: voltage, resistance, electrical impedance, electrical frequency, and/or amperage. As one example, a voltage level for the current provided to the scanning device may be increased by a desired amount (e.g., determined by empirical evidence), and used to collect a second image, where the second current configuration provides a next lowest perceived electrical sensation to the user.

Returning to 706, a second image can be collected by the relief print scanning device, using the second current configuration comprising the adjusted current (e.g., adjusted to the next level). The resulting image (e.g., second relief print image) may be analyzed, at 708, and the identified image characteristic(s) can be compared against the threshold(s). If the image is suitable (e.g., usable for relief print recognition), for example, the example implementation 700 may end at 718. However, if one or more of the thresholds are not met, the process 716-706-714 may be iterated, at least until a suitable image is identified. In this way, for example, the current provided to the scanning devices is merely incremented enough to provide a suitable image, which may result in a lower perceived electrical shock to a user of the device.

Figure 8:
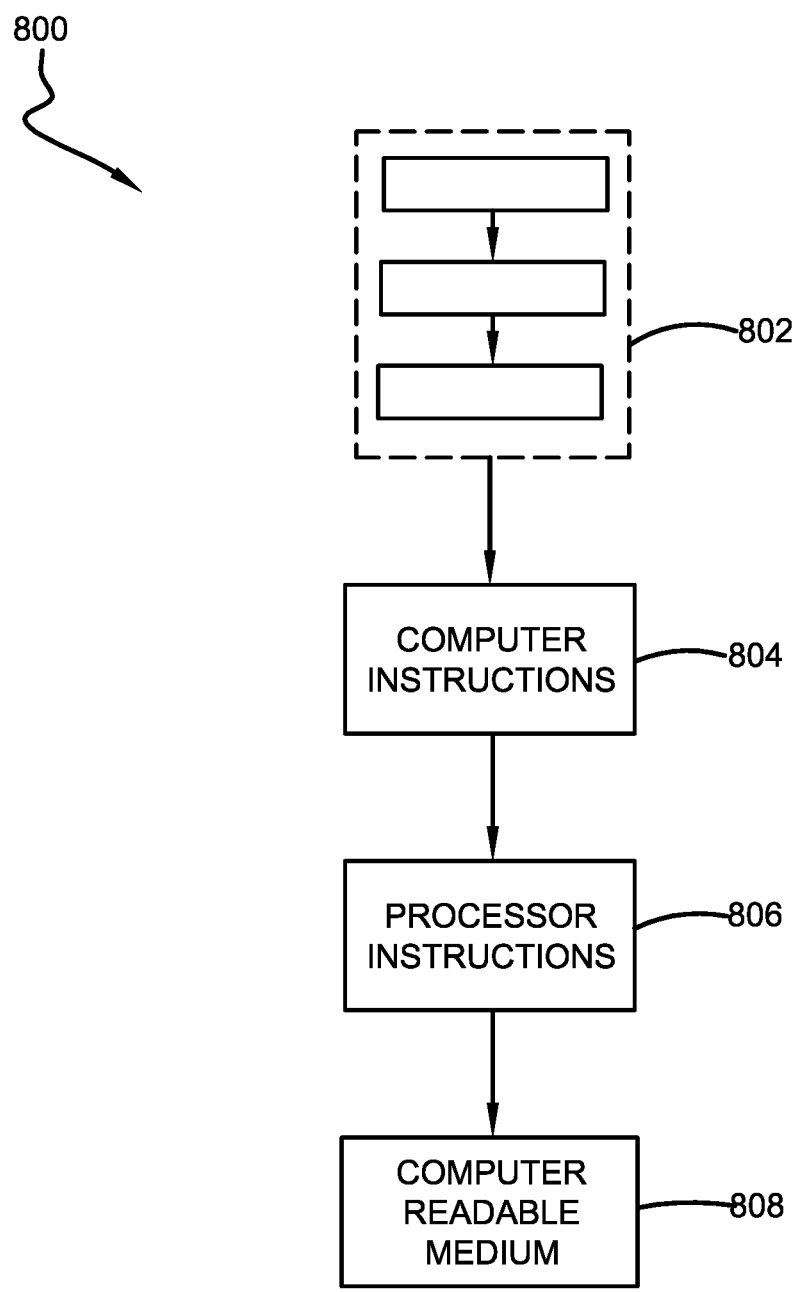
FIG. 8 is an illustration of an exemplary computer-readable medium comprising processor-executable instructions configured to embody one or more of the provisions set forth herein.

In another implementation, a computer-readable medium may comprise processor-executable instructions that can be configured to implement one or more portions of the one or more techniques presented herein. An example computer-readable medium is illustrated in FIG. 8, where the implementation 800 comprises a computer-readable medium 808 (e.g., a CD-R, DVD-R, a hard disk drive, flash-drive, non-volatile memory storage component), on which is encoded computer-readable data 806. This computer-readable data 806 in turn comprises a set of computer instructions 804 that can be configured to operate in accordance with one or more of the techniques set forth herein. In one such implementation 802, the processor-executable instructions 804 may be configured to perform a method, such as at least some of the exemplary method 600 of FIG. 6. In another such implementation, the processor-executable instructions 804 may be configured to implement a system, such as at least some of the exemplary system 400 of FIG. 4. Many such computer-readable media may be devised by those of ordinary skill in the art that are configured to operate in accordance with the techniques presented herein.

Figure 9:
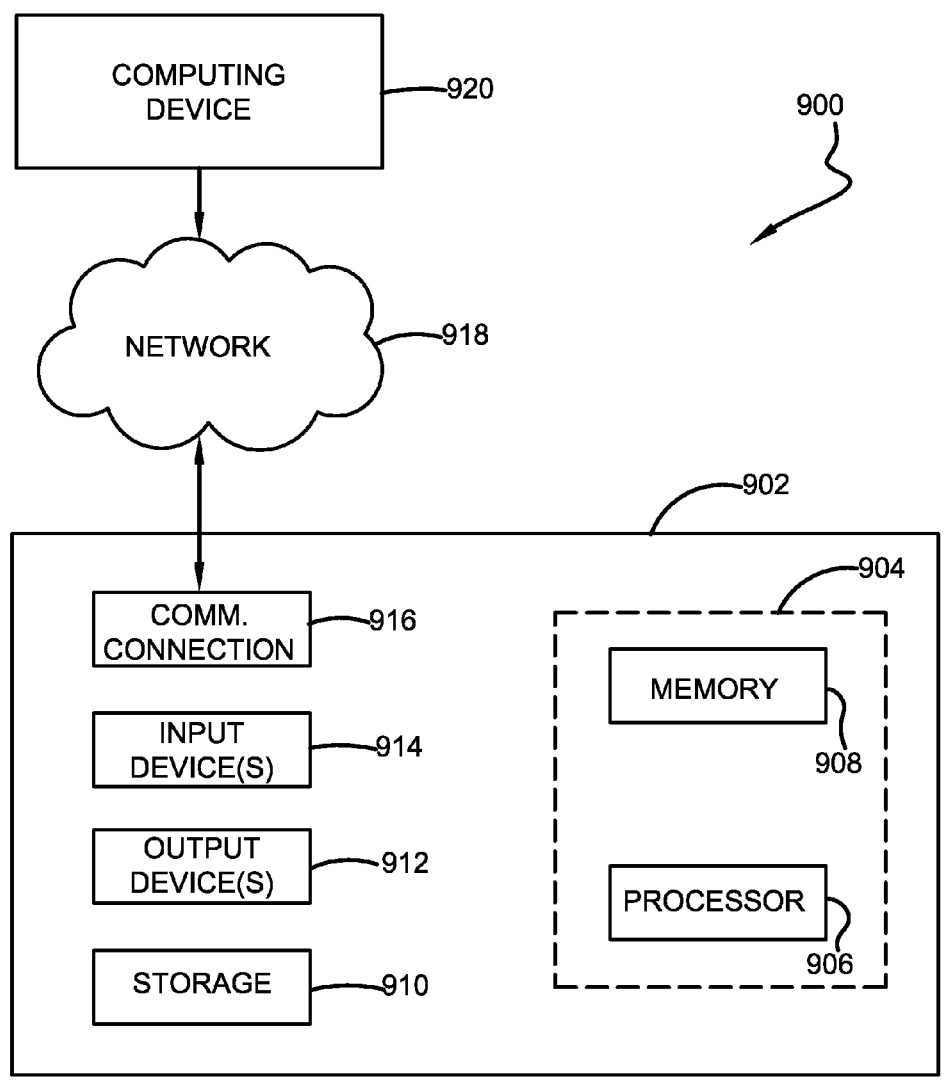
FIG. 9 illustrates an exemplary computing environment wherein one or more of the provisions set forth herein may be implemented.

FIG. 9 and the following discussion provide a brief, general description of a computing environment in/on which one or more or the implementations of one or more of the methods and/or system set forth herein may be implemented. The operating environment of FIG. 9 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of computer readable instructions executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more implementations provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other implementations, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one implementation, computer readable instructions to implement one or more implementations provided herein may be in storage 910. Storage 910 may also store other computer readable instructions to implement an operating system, an application program and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 904 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one implementation, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another implementation, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more implementations provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used in this application, the terms "component," "module," "system," "interface," and the like to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A system for mitigating perceived electrical sensation for relief print scanning, comprising:
   an electroluminescent-based relief print imaging device comprising a contact electrode configured to direct electrical current to a relief print object disposed in a scanning position on the imaging device; and
   an electrical current adjustment component operably coupled with the imaging device, and configured to provide adjusted electrical current for the contact electrode to mitigate perceived electrical sensation to a user of the imaging device, comprising:
      an image identification component configured to identify an image that meets an image characteristic threshold;
      a current determination component configured to identify an adjusted current characteristic for the electrical current to the contact electrode at least until the image identification component identifies the image that meets the image characteristic threshold; and
      a current modification component configured to modify the electrical current to the contact electrode based at least upon the adjusted current characteristic, resulting in the adjusted electrical current.

2. The system of claim 1, the electrical current adjustment component configured to receive data indicative of one or more image characteristics of a first image from the imaging device.

3. The system of claim 2, the image characteristics comprising one or more of:
   a level of image brightness;
   a level of image contrast;
   a metric indicative of an amount of edge detection in the image;
   a metric indicative of an amount of object detection in the image;
   a level of image luminance;
   a level of image chrominance;
   a level of noise identified in the image; and
   a level of luma identified for the image.

4. The system of claim 2, the image identification component configured to identify an image that meets an image characteristic threshold by comparing respective one or more of the image characteristics of the first image with a corresponding image threshold characteristic.

5. The system of claim 2, the electrical current adjustment component configured to receive data indicative of characteristics of the electrical current provided to the contact electrode.

6. The system of claim 2, the characteristics of the electrical current provided to the contact electrode comprising one or more of:
   a measure of voltage;
   a measure of resistance;
   a measure of electrical impedance;
   a measure of electrical frequency; and
   a measure of amperage.

7. The system of claim 1, the current determination component configured to identify an adjusted current characteristic for the electrical current to the contact electrode by identifying a predetermined next level of one or more of the characteristics of the electrical current provided to the contact electrode.

8. The system of claim 7, the current modification component configured to modify the electrical current to the contact electrode by applying the predetermined next level of the one or more of the characteristics of the electrical current provided to the contact electrode.

9. The system of claim 1, the imaging device configured to capture image data of the relief print object at least until the image identification component identifies an image that meets the image characteristic threshold.

10. A device that captures a relief print image while mitigating user perceived electrical sensation, comprising:
    an electroluminescent relief print capture system, configured to capture a first image of a relief print object using light directed from an electroluminescent layer disposed at an image capture surface;
    a current determination component configured to identify a current adjustment data for electrical current provided to the electroluminescent relief print capture system, based at least upon a first image characteristic of the first image captured using a first current configuration of the electrical current; and
    a current adjusting component, operably coupled with the current determination component, and configured to adjust the first current configuration, resulting in the second current configuration, based at least upon the current adjustment data provided by the current determination component, the second current configuration configured to mitigate perceived electrical sensation to a user of the electroluminescent relief print capture system.

11. The device of claim 10, current determination component configured to identify voltage adjustment data for the electrical current provided to the electroluminescent relief print capture system, based at least upon a first image characteristic of the first image captured using a first current voltage configuration of the electrical current.

12. The device of claim 10, comprising an image characteristic identification component configured to identify the first image characteristic of the first image.

13. The device of claim 12, the image characteristic identification component configured to identify at least one of: a brightness of the first image, and a contrast of the first image.

14. The device of claim 13, the resulting second current configuration configured to improve one or more of the brightness of the first image, and the contrast of the first image, in a subsequent second image of the relief print object captured by the electroluminescent relief print capture system using the second current configuration.

15. The device of claim 10, the electroluminescent relief print capture system comprising an electroluminescent based film operating in a voltage range of sixty to six hundred volts, inclusive.

16. The device of claim 15, the first current configuration of the electrical current operating from sixty to six hundred volts, and the second current configuration operating at a higher voltage than the first current configuration.

17. A method for mitigating perceived electrical sensation for a relief print scanning device, comprising:
    receiving data indicative of a first image captured by a electroluminescent-based relief print scanning device;
    identifying a first image characteristic of the data indicative of a first image;
    identifying a first electrical current configuration for electrical current used by the electroluminescent-based relief print scanning device to capture the first image;

comparing the first image characteristic to an image characteristic threshold indicative of a usable image;

identifying a second electrical current configuration, based at least upon the first electrical current configuration, for the electrical current for use by the electroluminescent-based relief print scanning device to capture a second image if the first image characteristic does not meet the image characteristic threshold; and adjusting the electrical current for use by the electroluminescent-based relief print scanning device to the second electrical current configuration, the second electrical current configuration configured to mitigate perceived electrical sensation by a user of the electroluminescent-based relief print scanning device.

18. The method of claim 17, identifying the first image characteristic of the data indicative of the first image comprising identifying one or more of: the brightness of the first image, and the contrast of the first image.

19. The method of claim 18, identifying the first electrical current configuration for electrical current used by the electroluminescent-based relief print scanning device to capture the first image comprising identifying a first voltage for the first electrical current configuration.

20. The method of claim 19, identifying the second electrical current configuration, based at least upon the first electrical current configuration, for the electrical current for use by the electroluminescent-based relief print scanning device to capture a second image if the first image characteristic does not meet the image characteristic threshold, comprising identifying a second voltage for the electrical current, comprising an increase in the voltage from the first voltage.

* * * * *